(12) United States Patent
Sun et al.

(10) Patent No.: US 11,319,971 B2
(45) Date of Patent: May 3, 2022

(54) VEHICLE DRIVING APPARATUS

(71) Applicants: TOYOTA JIDOSHA KABUSHIKI KAISHA, Toyota (JP); AISIN AW CO., LTD., Anjo (JP)

(72) Inventors: Chunyang Sun, Toyota (JP); Wataru Matsumoto, Toyota (JP); Tomonori Uchida, Anjo (JP); Fumiaki Shigematsu, Anjo (JP); Satoshi Miyanaga, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 38 days.

(21) Appl. No.: 17/034,900

(22) Filed: Sep. 28, 2020

(65) Prior Publication Data

US 2021/0095690 A1   Apr. 1, 2021

(30) Foreign Application Priority Data

Sep. 28, 2019   (JP) .............................. JP2019-178140

(51) Int. Cl.
*F04D 29/40*   (2006.01)
*F04D 27/00*   (2006.01)
(Continued)

(52) U.S. Cl.
CPC ......... *F04D 29/406* (2013.01); *F04D 27/009* (2013.01); *F04D 29/046* (2013.01);
(Continued)

(58) Field of Classification Search
CPC .... F04D 29/406; F04D 29/061; F04D 27/009; F01M 1/02; B60K 17/105; B60K 6/405;
(Continued)

(56) References Cited

U.S. PATENT DOCUMENTS 5,913,950 A * 6/1999 Matsufuji .............. B60K 17/04
74/730.1
8,495,928 B2 * 7/2013 Yamaguchi ........... F16H 57/035
74/606 R
(Continued)

FOREIGN PATENT DOCUMENTS

JP   2013-177030 A    9/2013
JP   2019-082189 A    5/2019
JP   2020159216 A  * 10/2020

*Primary Examiner* — Brian P Wolcott
*Assistant Examiner* — Jackson N Gillenwaters
(74) *Attorney, Agent, or Firm* — Oliff PLC

(57) ABSTRACT

A vehicle driving apparatus including: a fluid pump; a rotary member; a bearing supporting the rotary member; a pump cover covering the fluid pump; a relief valve; and a casing storing the fluid pump, the rotary member, the bearing, the pump cover and the relief valve. The casing includes a casing body and a casing cover. The casing cover defines a fluid passage that is in communication with an outlet port of the fluid pump, and includes cylindrical-shaped first and second boss portions. The first boss portion includes a supporting portion supporting the rotary member through the bearing which is fitted in a space radially inside the first boss portion. The second boss portion defines a valve room that is in communication with the fluid passage, with the relief valve being stored in the valve room.

4 Claims, 5 Drawing Sheets

(51) Int. Cl.
  *F04D 29/06* (2006.01)
  *F04D 29/046* (2006.01)
  *B60K 6/22* (2007.10)

(52) U.S. Cl.
  CPC .............. *F04D 29/061* (2013.01); *B60K 6/22* (2013.01); *B60Y 2200/92* (2013.01); *B60Y 2306/03* (2013.01); *B60Y 2306/05* (2013.01)

(58) Field of Classification Search
  CPC .... F04C 2/08; F04C 2/10; F04C 2/102; F04C 15/06
  See application file for complete search history.

(56) References Cited

U.S. PATENT DOCUMENTS

| | | | |
|---|---|---|---|
| 2013/0283972 A1* | 10/2013 | Yamamoto | F16H 57/0486 74/665 B |
| 2015/0105205 A1* | 4/2015 | Kurosaki | B60K 6/445 475/5 |
| 2019/0128179 A1* | 5/2019 | Kiyokami | F16H 57/0441 |
| 2020/0028412 A1* | 1/2020 | Ikemoto | H02K 5/20 |
| 2020/0393039 A1* | 12/2020 | Matsui | F16H 57/0423 |

* cited by examiner

VEHICLE DRIVING APPARATUS

This application claims priority from Japanese Patent Application No. 2019-178140 filed on Sep. 28, 2019, the disclosure of which is herein incorporated by reference in its entirety.

FIELD OF THE INVENTION

The present invention relates to a vehicle driving apparatus including a fluid pump that is to be driven by a drive force source.

BACKGROUND OF THE INVENTION

There is well known a vehicle driving apparatus including: a fluid pump; a rotary member that is to be rotated about an axis of the fluid pump; a bearing supporting the rotary member such that the rotary member is rotatable and is fitted at its axial end portion in an inner circumferential surface of the bearing; a pump cover covering the fluid pump; a relief valve configured, when a pressure of a fluid ejected by the fluid pump is excessively high, to discharge the fluid; and a casing storing therein the fluid pump, the rotary member, the bearing, the pump cover and the relief valve, wherein the casing includes (i) a casing body having an opening on a side of the bearing in a direction of the axis and (ii) a casing cover attached to the casing body and closing the opening of the casing body. Such a vehicle driving apparatus is disclosed in JP-2013-177030A.

SUMMARY OF THE INVENTION

By the way, in the vehicle driving apparatus disclosed in JP-2013-177030A, a flat plate is interposed between the casing cover and the pump cover that are opposed to each other, and the flat plate cooperates with a groove provided in an inner surface of the casing cover, to define a fluid passage that is in communication with an outlet port of the fluid pump. When a pressure of fluid in the fluid passage is excessively high, the fluid is discharged through the relief valve. The pump cover is provided with a horizontal hole, such that the relief valve is stored in a space defined by the horizontal hole and the plate. The pump cover is fastened to the casing cover through bolts, and the bearing supporting the rotary member is supported by the casing cover through the pump cover. Therefore, the pump cover and the casing cover have to be fastened to each other by a large fastening force. In the arrangement disclosed by the above-identified Japanese Patent Application Publication, the plate is required to be interposed between the casing cover and the pump cover, and the bolts are required to fasten the pump cover and the casing cover to each other, with the number of the bolts being required to be large, thereby problematically causing increase of the number of required components.

The present invention was made in view of the background art described above. It is therefore an object of the present invention to provide a vehicle driving apparatus capable of restraining increase of the number of parts or components.

The above object is achieved according to the following aspects of the present invention.

According to a first aspect of the invention, there is provided a vehicle driving apparatus comprising: (a) a fluid pump; (b) a rotary member that is to be rotated about an axis of the fluid pump; (c) a bearing supporting the rotary member such that the rotary member is rotatable and is fitted at an axial end portion thereof in an inner circumferential surface of the bearing; (d) a pump cover covering the fluid pump; (e) a relief valve configured, when a pressure of a fluid ejected by the fluid pump exceeds a threshold pressure value, to discharge the fluid; and (f) a casing storing therein the fluid pump, the rotary member, the bearing, the pump cover and the relief valve, wherein the casing includes (i) a casing body having an opening on a side of the bearing in a direction of the axis and (ii) a casing cover attached to the casing body and closing the opening of the casing body, wherein the casing cover defines therein a fluid passage that is in communication with an outlet port of the fluid pump, and includes cylindrical-shaped first and second boss portions, wherein the first boss portion cooperates with the pump cover to defines, in a space radially inside the first boss portion, a pump room in which the fluid pump is stored, and includes a supporting portion supporting the rotary member through the bearing which is located between the pump cover and the casing body and which is fitted in the space radially inside the first boss portion, wherein the first boss portion is located in a space outside the rotary member around a circumference of the rotary member, the first boss portion protruding in a direction parallel to the axis toward the casing body, and wherein the second boss portion defines therein a valve room that is in communication with the fluid passage, with the relief valve being stored in the valve room, the second boss portion protruding toward the casing body.

According to a second aspect of the invention, in the vehicle driving apparatus according to the first aspect of the invention, the casing cover further includes a plate-shaped rib portion that protrudes toward the casing body, wherein the rib portion is connected at an end portion thereof to an outer circumferential surface of the second boss portion and at another end portion thereof to an outer circumferential surface of the first boss portion, and defines a lubricant passage for guiding the fluid supplied to the end portion of the rib portion, toward the other end portion of the rib portion, and wherein the first boss portion includes a connected portion that is connected to the lubricant passage, and has a through-hole provided in the connected portion such that the lubricant passage is in communication with a space radially inside the supporting portion through the through-hole.

According to a third aspect of the invention, in the vehicle driving apparatus according to the second aspect of the invention, the rib portion defining the lubricant passage is provided in the casing cover, such that the other end portion of the rib portion is located on a lower side of the end portion of the rib portion in a vertical direction of a vehicle when the casing is installed in the vehicle.

According to a fourth aspect of the invention, in the vehicle driving apparatus according to the second or third aspect of the invention, the casing cover further includes a cylindrical-shaped third boss portion protruding toward the casing body, wherein the third boss portion is provided with a receiving hole that is in communication with the lubricant passage in the end portion of the rib portion such that the fluid received into the receiving hole from a side of the casing body is to be supplied through the receiving hole to the end portion of the rib portion.

In the driving apparatus according to the first aspect of the invention, the casing cover defines therein the fluid passage, and includes the second boss portion that defines therein the valve room that is in communication with the fluid passage, with the relief valve being stored in the valve room, so that a plate does not required to be interposed between the casing cover and the pump cover. Further, the casing cover includes the first boss portion that supports the rotary member through the bearing that is fitted in the first boss portion. Thus, since the bearing is supported directly by the casing cover, the pump cover and the casing cover do not have to be fastened to each other by a large fastening force. Therefore, it is possible to reduce the number of bolts used to fasten the pump cover to the casing cover. Further, for example, where the pump cover is fixed to the casing cover with the pump cover being pressed against the casing cover by the bearing, or with the pump cover being fitted in the supporting portion, the pump cover can be fixed to the casing cover without using any bolt. Thus, it is possible to restrain increase of the number of parts or components.

In the driving apparatus according to the second aspect of the invention, the casing cover includes the rib portion defining the lubricant passage for guiding the fluid in a direction away from the second boss portion toward the first boss portion, and the first boss portion has the through-hole that communicates the lubricant passage and the space radially inside the supporting portion. Thus, it is possible to lubricate the bearing with a construction of the driving apparatus being restrained from being complicated. From another viewpoint, in general, it is common that a rib portion is provided between bosses. In the driving apparatus according to the second aspect of the invention in which such a rib portion commonly provided between bosses is utilized to supply the fluid to the bearing, the bearing can be lubricated with the construction being restrained from being complicated. Such a rib portion cannot be provided in an arrangement in which the relief valve is stored in the pump cover. However, such a rib portion can be provided in the driving apparatus according to the second aspect of the invention in which the casing cover includes the second boss portion in which the relief valve is stored.

In the driving apparatus according to the third aspect of the invention, the above-described other end portion of the rib portion, which is located on a side of the bearing, is located on the lower side of the above-described end portion of the rib portion, which is located on a fluid supply side, so that the fluid supplied to the end portion of the rib portion can be caused to flow along the rib portion.

In the driving apparatus according to the fourth aspect of the invention, the casing cover includes the third boss portion configured to receive the fluid supplied to the above-described end portion of the rib portion from the side of the casing body, so that the fluid can be supplied to the side of the end portion of the rib portion.

DETAILED DESCRIPTION OF PREFERRED EMBODIMENT

Hereinafter, a preferred embodiment of the invention will be described in detail with reference to the accompanying drawings.

Embodiment

Figure 1:
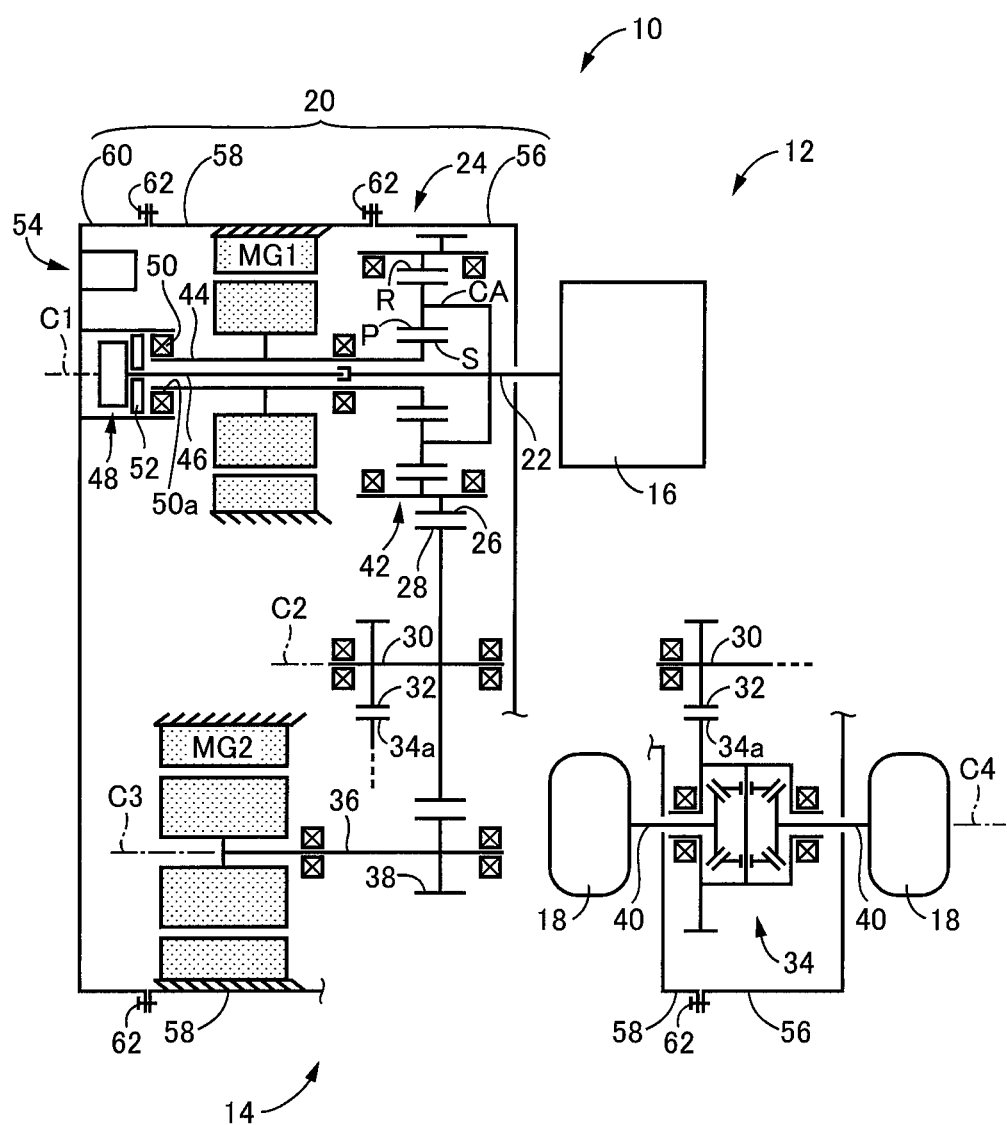
FIG. 1 is a view for explaining an outline of a construction of a vehicle driving apparatus to which the present invention is applied.

FIG. 1 is a view for explaining an outline of a construction of a vehicle driving apparatus 12 to which the present invention is applied and which is installed in a vehicle 10. As shown in FIG. 1, the vehicle driving apparatus 12 includes a drive-force transmitting device 14, an engine 16, a first motor generator (that may be referred also to as "first rotating machine") MG1, a second motor generator (that may be referred also to as "second rotating machine") MG2, drive wheels 18 and a transaxle case 20 as a casing. The transaxle case 20 is a non-rotary member attached to a body of the vehicle 10.

The drive-force transmitting device 14 is disposed in a drive-force transmitting path between the engine 16 and the drive wheels 18. The drive-force transmitting device 14 includes: an input shaft 22 connected to the engine 16; a transmission portion 24 connected to the input shaft 22; a driven gear 28 meshing with a drive gear 26 that is an output rotary member of the transmission portion 24; a driven shaft 30 to which the driven gear 28 is fixed to be unrotatable relative to the driven shaft 30; a final gear 32 fixed to the driven shaft 30 so as to be unrotatable relative to the driven shaft 30; a differential gear 34 meshing with the final gear 32 through a differential ring gear 34a; and a reduction gear 38 meshing with the driven gear 28 and connected to an MG2 rotor shaft 36 that is a rotor shaft of the second motor generator MG2. These input shaft 22, transmission portion 24, driven gear 28, driven shaft 30, final gear 32, differential gear 34, reduction gear 38 and other elements are disposed inside the transaxle case 20. The drive-force transmitting device 14 further includes axles 40 connected to the differential gear 34. The final gear 32 and the reduction gear 38 are gears each having a diameter smaller than that of the driven gear 28. In the drive-force transmitting device 14 constructed as described above, a drive force of the engine 16 and/or a drive force of the second motor generator MG2 are transmitted to the driven gear 28, and are then transmitted from the driven gear 28 through the final gear 32, differential gear 34 and axles 40, for example, sequentially, to the drive wheels 18.

The drive-force transmitting device 14 is used advantageously for a vehicle of FF (front engine and front drive) system. In the drive-force transmitting device 14, the input shaft 22, driven shaft 30, MG2 rotor shaft 36 and axles 40 are arranged in parallel to each other. In the following description of the present embodiment, an axis of the input shaft 22 will be referred to as "first axis C1", an axis of the driven shaft 30 will be referred to as "second axis C2", an axis of the MG2 rotor shaft 36 will be referred to as "third axis C3" and an axis of the axles 40 will be referred to as "fourth axis C4". Therefore, these four axes C1, C2, C3, C4 are parallel to each other. The engine 16, the transmission portion 24 and the first motor generator MG1 are disposed on the first axis C1. The driven gear 28 and the final gear 32 are disposed on the second axis C2. The second motor generator MG2 and the reduction gear 38 are disposed on the third axis C3. The differential gear 34 is disposed on the fourth axis C4.

The transmission portion 24 includes a planetary gear mechanism 42 as a drive-force distributing mechanism configured to distribute the drive force transmitted from the engine 16 through the input shaft 22, to the first motor generator MG1 and the drive gear 26. The planetary gear mechanism 42 is a known planetary gear device of single-pinion type including a sun gear S, pinion gears P, a carrier CA supporting the pinion gears P, and a ring gear R meshing with the sun gear S through the pinion gears P, such that each of the pinion gears P is rotatable about its axis and revolvable about the first axis C1. The planetary gear mechanism 42 serves as a differential mechanism providing a differential effect. In the planetary gear mechanism 42, the sun gear S is connected to an MG1 rotor shaft 44 that is a rotor shaft of the first motor generator MG1, the carrier CA is connected to the engine 16 through the input shaft 22, and the ring gear R is provided in an inner circumferential surface of the drive gear 26.

The transmission portion 24 is an electric transmission mechanism in which a differential state of the planetary gear mechanism 42 is controlled by controlling an operation state of the first motor generator MG1. The vehicle 10 can be caused to run with a drive torque in the form of a direct torque that is mechanically transmitted to the ring gear R with the first motor generator MG1 receiving a reaction force of an engine torque inputted to the carrier CA and a second motor generator torque outputted by the second motor generator MG2 that is driven by an electric power generated by the first motor generator MG1 based on the drive force of the engine 16 distributed to the first motor generator MG1. Further, the vehicle 10 can be caused to perform a motor run with the drive torque consisting of only the second motor generator torque outputted by the second motor generator MG2 that is driven by the electric power supplied from a battery (not shown) in a state in which the engine 16 is stopped.

The vehicle driving apparatus 12 further includes a pump drive shaft 46, an oil pump 48 as a fluid pump, a bearing 50, a pump cover 52 and a relief valve 54 that are disposed inside the transaxle case 20. The pump drive shaft 46 is connected to the input shaft 22 through a spline engagement by which the pump drive shaft 46 is unrotatable relative to the input shaft 22. The oil pump 48 is connected to the pump drive shaft 46 and is disposed on the first axis C1. Therefore, the MG1 rotor shaft 44 is a rotary member that is to be rotated about the first axis C1 that corresponds to an axis of the oil pump 48. The oil pump 48 is to be driven by the engine 16 through the input shaft 22 and the pump drive shaft 46. The engine 16 is a drive force source that is connected to the pump drive shaft 46 in a drive-force transmittable manner. The oil pump 48 is configured, when being driven by the engine 16, to eject an oil OIL as a fluid that is to be used to lubricate the bearing 50 and other components of the drive-force transmitting device 14 and to cool the first and second motor generators MG1, MG2. The bearing 50 supports the MG1 rotor shaft 44 such that the MG1 rotor shaft 44 is rotatable and is fitted at its axial end portion in an inner circumferential surface 50a of the bearing 50. The axial end portion of the MG1 rotor shaft 44 is one of axially opposite end portions of the MG1 rotor shaft 44 which is opposite to the other of the axially opposite end portions at which the MG1 rotor shaft 44 is connected to the planetary gear mechanism 42, namely, at which the MG1 rotor shaft 44 is connected to a member configured to receive the drive force of the first motor generator MG1 through the MG1 rotor shaft 44. The first motor generator MG1 is a drive force source that is connected to the MG1 rotor shaft 44 in a drive-force transmittable manner. The pump cover 52 covers the oil pump 48. The relief valve 54 is a known relief valve including a piston sleeve and a spring. The relief valve 54 is configured to discharge the oil OIL supplied from the oil pump 48 when a pressure of the oil OIL is excessively high, namely, when the pressure exceeds a threshold pressure value. That is the relief valve 54 is provided to avoid an unnecessarily high increase of the pressure of the oil OIL supplied from the oil pump 48, so as to reduce a driving loss of the oil pump 48.

The transaxle case 20 as the casing includes a first casing 56, a second casing 58 and a casing cover 60. The first casing 56 is a generally cylindrical-shaped casing having a bottom wall, and defines therein a gear room in which the transmission portion 24 and the driven gear 28 are stored. The second casing 58 is a generally cylindrical-shaped casing having a bottom wall, and defines therein a motor room in which the first and second motor generators MG1, MG2 are stored. The second casing 58 is a casing body having an opening located in one of its opposite end potions which is remote from the engine 16, namely, located on a side of the bearing 50 provided in the one of the axially opposite end portions of the MG1 rotor shaft 44. The one of the axially opposite end portions of the MG1 rotor shaft 44 is located on the same side as one of axially opposite end portions of the pump drive shaft 46 at which the pump drive shaft 46 is connected to the oil pump 48, in a direction of the first axis C1. The first and second casings 56, 58 are integrally connected to each other through fasteners 62 such as bolts such that an opening end portion of the first casing 56 mates with an end portion of the second casing 58 on a side of the engine 16. The bottom wall of the second casing 58 serves as a partition wall by which the gear room and the motor room are separated from each other. The casing cover 60 is connected to the second casing 58 and covers the opening of the second casing 58, wherein the opening of the second casing 58 is located in the above-described one of its opposite end potions which is remote from the engine 16. The second casing 58 and the casing cover 60 are integrally connected to each other through the fasteners 62, such that the motor room is defined by cooperation of the second casing 58 and the casing cover 60. Thus, the transaxle case 20 is a casing stores therein the above-described MG1 rotor shaft 44, oil pump 48, bearing 50, pump cover 52 and relief valve 54.

Figure 2:
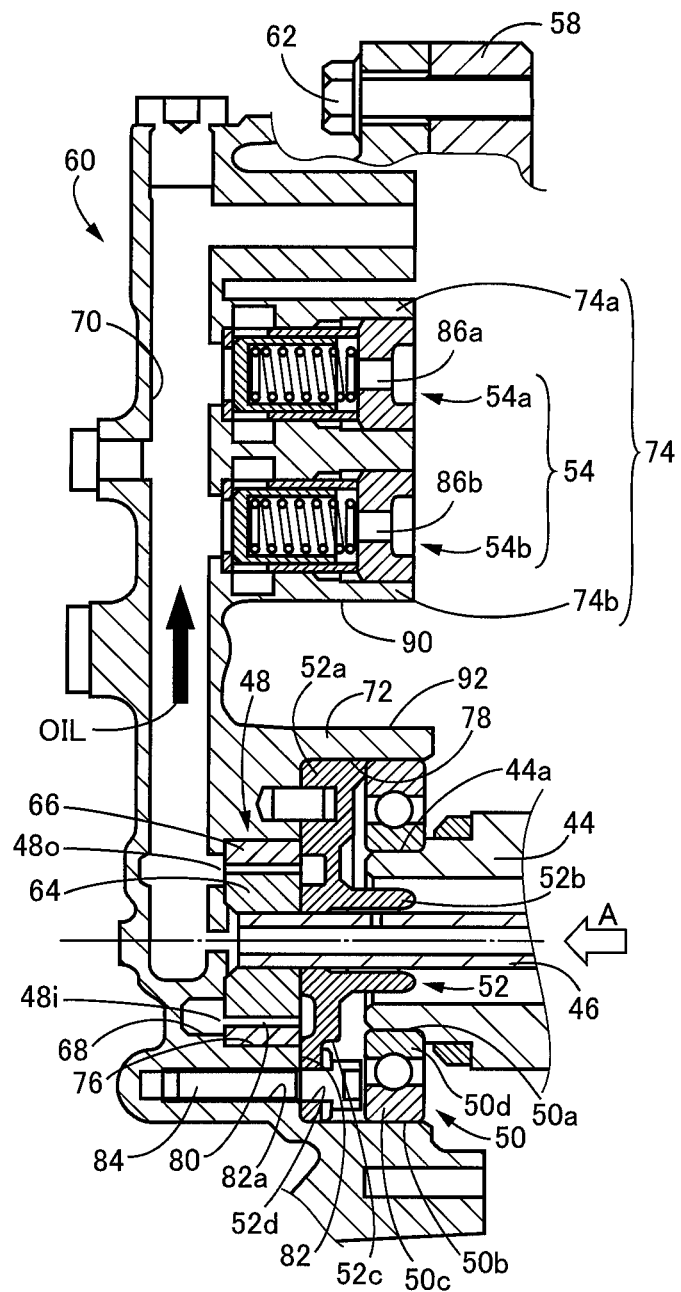
FIG. 2 is a cross sectional view for explaining a construction of an oil pump and a construction of a portion of a casing cover around the oil pump.
Figure 3:
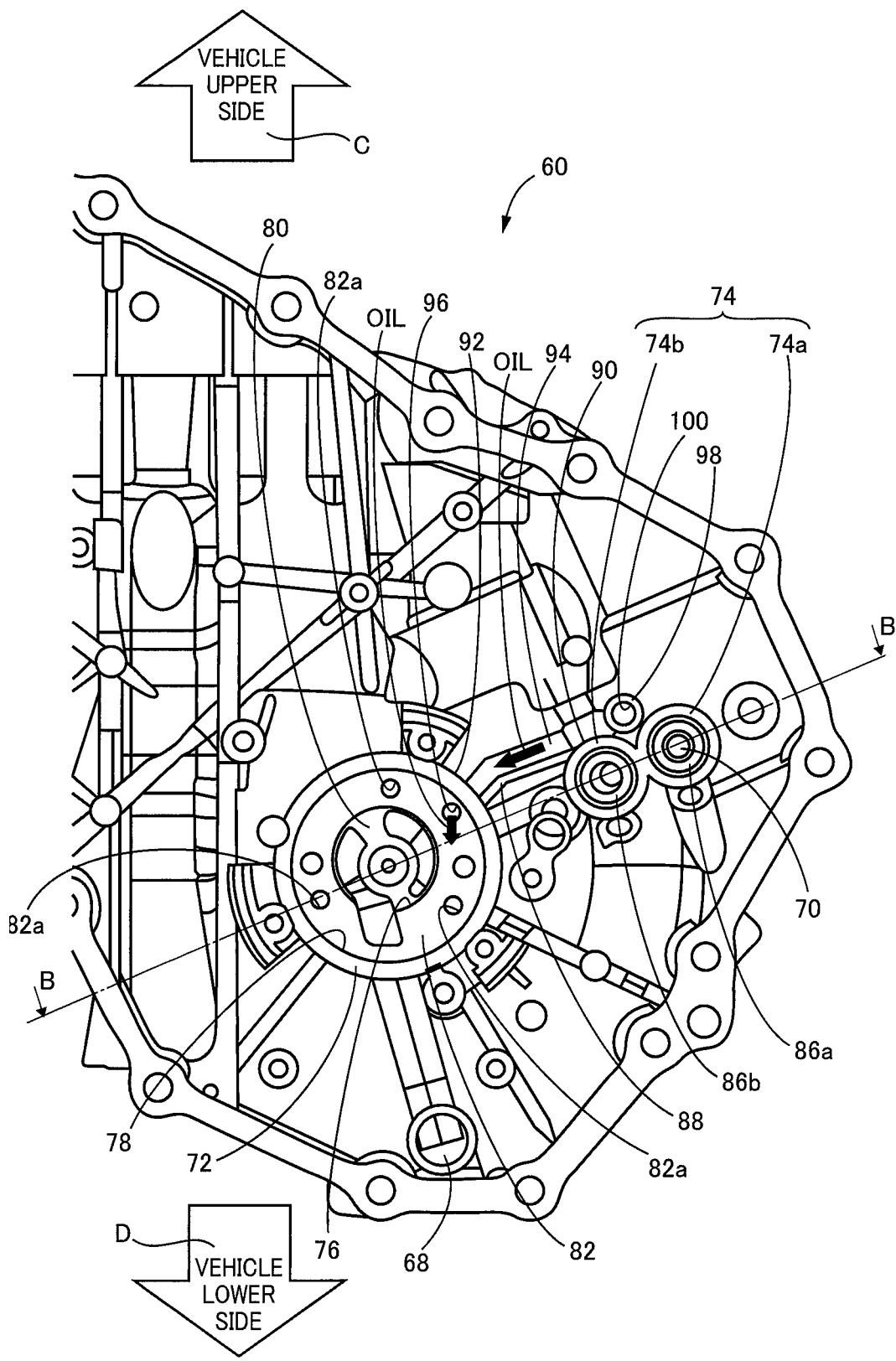
FIG. 3 is a view of the casing cover, as seen in a direction of arrow A indicated in FIG. 2.
Figure 4:
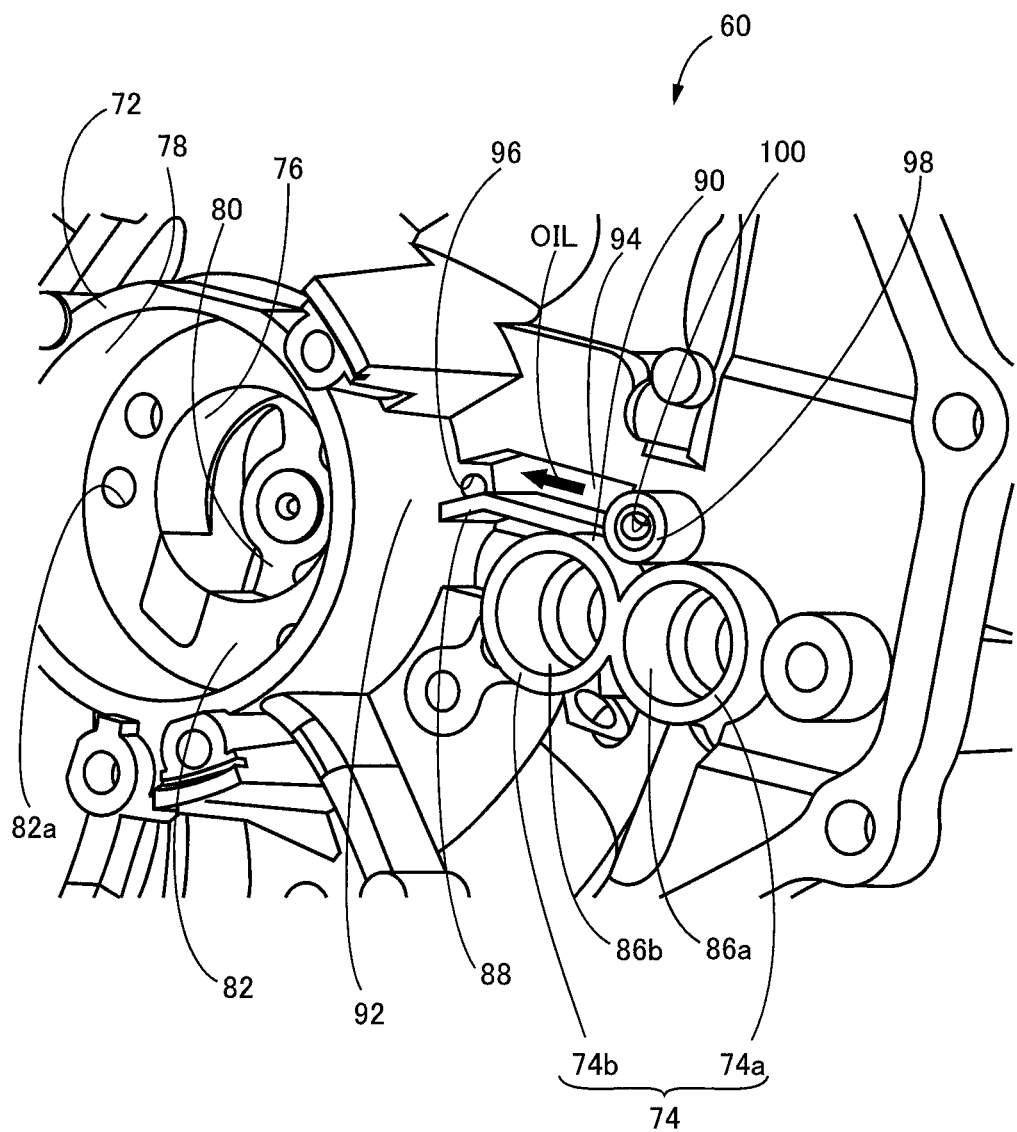
FIG. 4 is a perspective view showing boss portions and their vicinities in the casing cover shown in FIG. 3.
Figure 5:
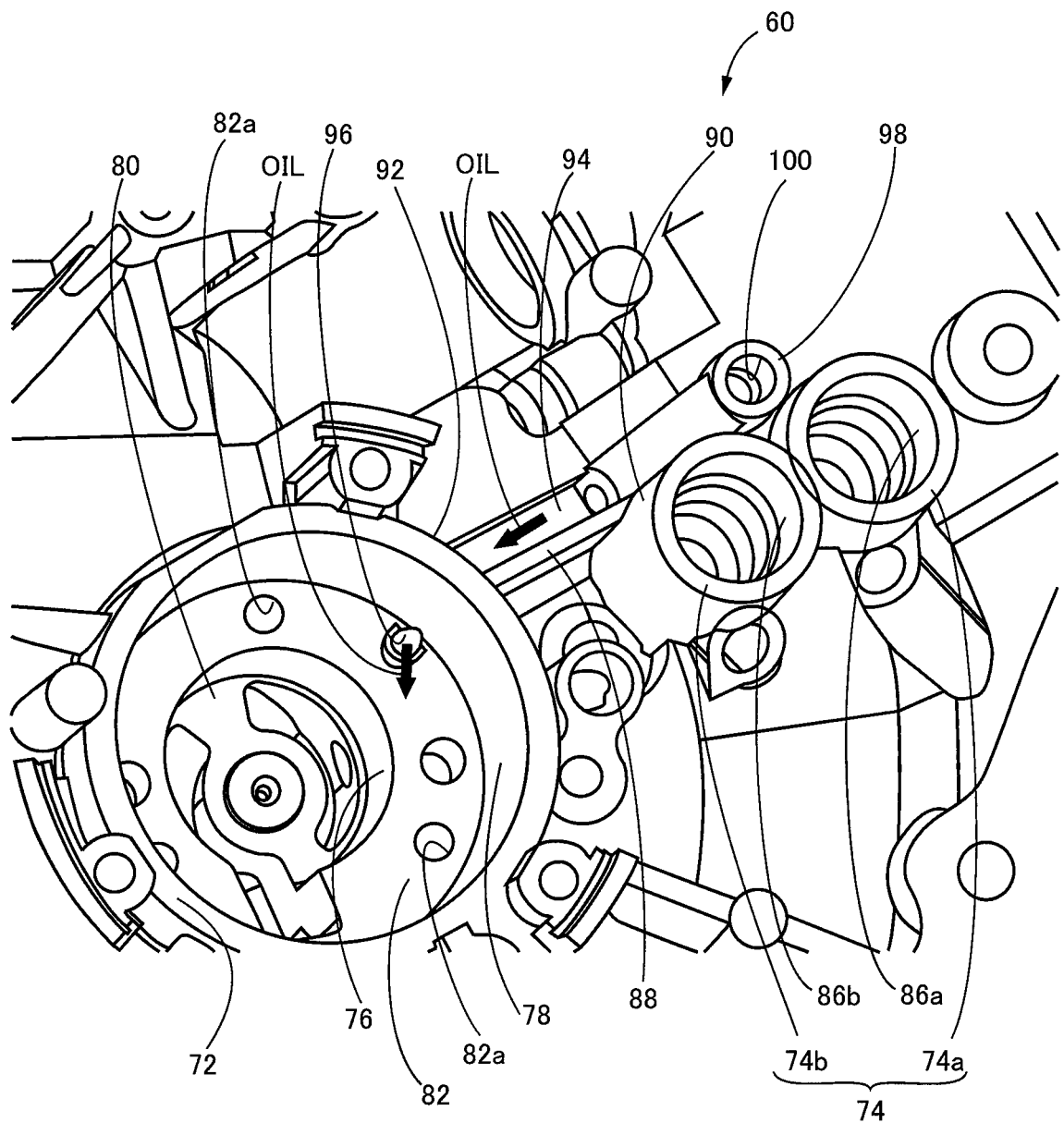
FIG. 5 is another perspective view showing the boss portions and their vicinities in the casing cover shown in FIG. 3, as seen from an angle different from FIG. 4.

FIGS. 2-5 are views for explaining constructions of the oil pump 48 and the casing cover 60. FIG. 2 is a cross sectional view for explaining a construction of the oil pump 48 and a construction of a portion of the casing cover 60 around the oil pump 48. FIG. 3 is a view of the casing cover 60, as seen from a side of the engine 16 in an axial direction of the pump drive shaft 46, namely, as seen in a direction of arrow A indicated in FIG. 2. Therefore, FIG. 2 is a cross sectional view taken along line B-B indicated in FIG. 3 and showing the casing cover 60 in which the oil pump 48 and other components are stored. FIG. 4 is a perspective view of storing portions of the casing cover 60 which store therein the oil pump 48 and other components and vicinities of the storing portions, which are shown in FIG. 3. FIG. 5 is another perspective view of the storing portions of the casing cover 60 and the vicinities of the storing portions, which are shown in FIG. 3, as seen from an angle different from FIG. 4. FIG. 3 shows a state in which the transaxle case 20 is installed in the vehicle 10, wherein arrow C indicates an upward direction of the vehicle 10 while arrow D indicates a downward direction of the vehicle 10.

As shown in FIG. 2, the oil pump 48 includes a drive rotor 64 and a driven rotor 66 that cooperate with each other to constitute pump gears. The drive rotor 64 has outer circumferential teeth, and is connected, at one of its axially opposite end portions which are opposite to each other in the axial direction of the pump drive shaft 46, to the pump drive shaft 46. The driven rotor 66 has an annular shape and inner circumferential teeth that mesh with the outer circumferential teeth of the drive rotor 64. The oil pump 48 is an internal gear pump in which the drive rotor 64 and the driven rotor 66 mesh with each other.

The casing cover 60 defines therein an oil introducing passage 68 and an oil delivering passage 70, and includes a first boss portion 72 and a second boss portion 74.

The oil introducing passage 68 is a fluid passage which is defined in the casing cover 60 and which is in communication with an inlet port 48$i$ of the oil pump 48, such the oil OIL is to flow through the oil introducing passage 68 so as to be introduced or sucked into the oil pump 48. The oil delivering passage 70 is a fluid passage which is defined in the casing cover 60 and which is in communication with an outlet port 48$o$ of the oil pump 48, such that the oil OIL ejected by the oil pump 48 is to flow through the oil delivering passage 70 so as to be delivered.

The first boss portion 72 is a cylindrical-shaped wall portion which is located in a space outside the MG1 rotor shaft 44 around a circumference of the MG1 rotor shaft 44, and which protrudes in parallel to the axial direction of the MG1 rotor shaft 44 toward the second casing 58. The first boss portion 72 has an opening on a side of the second casing 58. The first boss portion 72 has first and second inner circumferential surfaces 76, 78 that are adjacent to each other in the axial direction of the pump drive shaft 46 such that the second inner circumferential surface 78 is located between the first inner circumferential surface 76 and the engine 16 that is located on a side of the other of the above-described axially opposite end portions of the pump drive shaft 46. The second inner circumferential surface 78 has a diameter larger than that of the first inner circumferential surface 76.

The first boss portion 72 cooperates with the pump cover 52 to defines, in a space radially inside the first inner circumferential surface 76, a pump room 80 in which the oil pump 48 is stored. Specifically, the pump cover 52 is disposed in a space radially inside the second inner circumferential surface 78. The pump cover 52 includes a disk-plate-shaped main body portion 52$a$ and a cylindrical-shaped tubular portion 52$b$ which is locate radially inside the main body portion 52$a$ and which protrudes in parallel to the axial direction of the pump drive shaft 46 toward the second casing 58. The tubular portion 52$b$ is fitted on the pump drive shaft 46. In a space radially inside the first boss portion 72, a step portion 82 is provided between the first and second inner circumferential surfaces 76, 78, owing to a difference in diameter between the first and second inner circumferential surfaces 76, 78. The step portion 82 may be referred to as "interconnecting surface" that interconnects the first and second inner circumferential surfaces 76, 78. The main body portion 52$a$ of the pump cover 52 is provided with a plurality of cutouts 52$c$ in a radially outer portion of its opposite-side surface that is opposite to its opposed surface opposed to the step portion 82 of the first boss portion 72. The pump cover 52 is fixed to the step portion 82 of the first boss portion 72 through bolts 84 which pass through respective holes 52$d$ provided in the respective cutouts 52$c$ and is screwed in respective threaded holes 82$a$ provided in the step portion 82 of the first boss portion 72. The pump room 80 is defined by cooperation of the pump cover 52 and the casing cover 60 that includes the first boss portion 72, and is located in the space radially inside the first boss portion 72. That is, in the space radially inside the first boss portion 72, the pump room 80 is defined between the pump cover 52 and a portion of the casing cover 60 which constitutes a bottom portion of the first boss portion 72. The oil pump 48 is provided in the pump room 80, and is sandwiched between the pump cover 52 and the casing cover 60.

The second inner circumferential surface 78 serves as a supporting portion supporting the MG1 rotor shaft 44 through the bearing 50 that is fitted in the space radially inside the second inner circumferential surface 78 as the supporting portion, such that the MG1 rotor shaft 44 is rotatable. Thus, the first boss portion 72 is provided with the supporting portion. Specifically, the bearing 50 is fitted at its outer circumferential surface 50$b$ in the second inner circumferential surface 78, and is located to be adjacent to the pump cover 52. The bearing 50 is fixed in the second inner circumferential surface 78 with its outer race 50$c$ being press-fitted in the second inner circumferential surface 78. Further, the bearing 50 is fitted at its inner race 50$d$ on an outer circumferential surface 44$a$ of the above-described one of the axially opposite end portions of the MG1 rotor shaft 44. As described above, since the pump cover 52 is located to be adjacent to the oil pump 48, the bearing 50 is located on a side of the second casing 58 relative to the pump cover 52, namely, the bearing 50 is located between the pump cover 52 and the second casing 58. That is, in the first boss portion 72, the oil pump 48, pump cover 52 and bearing 50 are stored and arranged in this order of description. Therefore, an outside diameter of the main body portion 52$a$ of the pump cover 52 is smaller than an outside diameter of the bearing 50. Thus, the first boss portion 72 serves as a storing portion storing therein the oil pump 48 and the bearing 50.

The second boss portion 74 is a cylindrical-shaped wall portion which protrudes toward the second casing 58, and which is located radially outside the first boss portion 72 in the casing cover 60, namely, is located to be radially distant from the first axis C1. In the present embodiment, the relief valve 54 includes a first valve unit 54$a$ and a second valve unit 54$b$, for example, for a fail-safe purpose taking account of a possible failure of one of the two valve units 54$a$, 54$b$. The second boss portion 74 includes a first-valve storing boss 74$a$ storing therein the first valve unit 54$a$ and a second-valve storing boss 74$b$ storing therein the second valve unit 54$b$. The first-valve storing boss 74$a$ is in communication with the oil delivering passage 70, and defines a valve room 86$a$ in which the first valve unit 54$a$ is stored. The second-valve storing boss 74$b$ is in communication with the oil delivering passage 70, and defines a valve room 86$b$ in which the second valve unit 54$b$ is stored. Each of the first and second-valve storing bosses 74$a$, 74$b$ has an opening in its end portion on a side of the second casing 58. The first and second valve units 54$a$, 54$b$ of the relief valve 54 are introduced through the openings of the respective first and second-valve storing bosses 74$a$, 74$b$ so as to be fitted and stored in the respective valve rooms 86$a$, 86$b$. Thus, the second boss portion 74 serves as a storing portion storing therein the relief valve 54. The second boss portion 74 storing therein the relief valve 54 is provided in the casing cover 60, so that the pump cover 52 does not have to be extended radially outwardly, for example, for storing therein the relief valve 54.

The casing cover 60 further includes a rib portion 88 (see FIGS. 3-5). The rib portion 88 is a flat-plate-shaped rib which protrudes toward the second casing 58 and which is connected at one of its opposite end portions to an outer circumferential surface 90 of the second boss portion 74 and at the other of its opposite end portions to an outer circumferential surface 92 of the first boss portion 72. The outer circumferential surface 90 of the second boss portion 74 is, for example, an outer circumferential surface of the second-valve storing boss 74*b*. Thus, the rib portion 88 defines a lubricant passage 94 configured to guide the oil OIL supplied to a side of the second boss portion 74 that is connected to the one of the opposite end portions of the rib portion 88, toward the first boss portion 72 that is connected to the other of the opposite end portions of the rib portion 88.

The oil OIL, which flows along the lubricant passage 94 to be supplied to the first boss portion 72, lubricates the bearing 50 that is stored in the first boss portion 72. To this end, the first boss portion 72 has a through-hole 96 provided in its connected portion connected to the lubricant passage 94, such that the lubricant passage 94 is in communication with the space radially inside the second inner circumferential surface 78 through the through-hole 96. The through-hole 96 constitutes a fluid passage communicating the connected portion in the outer circumferential surface 92 of the first boss portion 72 (which is connected to the lubricant passage 94) and a contact surface of the step portion 82 of the first boss portion 72 which is in contact with the pump cover 52. The above-described other of the opposite end portions of the rib portion 88 that defines the lubricant passage 94 is positioned relative to the second boss portion 74, such that the other of the opposite end portions of the rib portion 88 (which is connected to the first boss portion 72) is located on a lower side of the second boss portion 74 in a vertical direction of the vehicle 10 when the transaxle case 20 is installed in the vehicle 10 (see FIG. 3). In the casing cover 60, a side surface of the second boss portion 74 storing therein the relief valve 54 is utilized to define the fluid passage through which the oil OIL is to flow to lubricate the bearing 50. A fluid passage like the lubricant passage 94 cannot be defined, for example, in an arrangement in which the pump cover 52 is extended radially outward to store therein the relief valve 54.

As described above, the oil OIL for lubricating the bearing 50 is supplied to the side of the second boss portion 74 that is connected to the above-described one of the opposite end portions of the rib portion 88. To this end, the casing cover 60 further includes a third boss portion 98 (see FIGS. 3-5). The third boss portion 98 is a cylindrical-shaped wall portion which protrudes toward the second casing 58, and which is located to be adjacent to the above-described one of the opposite end portions of the rib portion 88 that defines the lubricant passage 94, wherein the one of the opposite end portions of the rib portion 88 is connected to the second boss portion 74. The third boss portion 98 is provided with a receiving hole 100 that is in communication with the lubricant passage 94 on a side of the one of the opposite end portions of the rib portion 88 such that the oil OIL received into the receiving hole 100 from a side of the second casing 58 is to be supplied through the receiving hole 100 to the side of the one of the opposite end portions of the rib portion 88.

For the lubrication to the bearing 50, for example, the oil OIL is pumped up by an oil pump other than the above-described oil pump 48 through a pipe toward an upper side of the first casing 56 in the vertical direction of the vehicle 10 in a state in which the transaxle case 20 is installed in the vehicle 10. The pumped oil OIL is supplied through the pipe to a first catch tank that is provided in an upper portion of the first casing 56. The oil OIL overflowing from this first catch tank is caused to flow down into a second catch tank that is located in a lowermost portion of the first casing 56 and enter into an oil hole provided in the second catch tank. The second casing 58 is provided with a boss which is connected to the receiving hole 100 of the third boss portion 98 and also to the oil hole provided in the second catch tank, so that the oil OIL is caused to flow into the receiving hole 100 through an oil passage provided in the boss. Thus, the oil OIL is supplied to the receiving hole 100 from the side of the second casing 58. The oil OIL supplied into the receiving hole 100 is caused to flow out of the receiving hole 100 to the lubricant passage 94 defined by the rib portion 88 and then flow along the lubricant passage 94 toward the first boss portion 72. The oil OIL having reached the outer circumferential surface 92 of the first boss portion 72 is caused to flow into the through-hole 96. The oil OIL having passed through the through-hole 96 is caused to flow out to the space radially inside the second inner circumferential surface 78 of the first boss portion 72 so as to be supplied to the bearing 50.

As described above, in the present embodiment, the casing cover 60 defines therein the oil delivering passage 70 as the fluid passage and includes the second boss portion 74, so that a plate does not required to be interposed between the casing cover 60 and the pump cover 52. Further, since the casing cover 60 includes the first boss portion 72, namely, the bearing 50 is supported directly by the casing cover 60, the pump cover 52 and the casing cover 60 do not have to be fastened to each other by a large fastening force. Therefore, it is possible to reduce the number of the bolts 84 used to fasten the pump cover 52 to the casing cover 60, and accordingly to restrain increase of the number of parts or components.

In the present embodiment, the casing cover 60 includes the rib portion 88 and the first boss portion 72 has the through-hole 96 so that it is possible to lubricate the bearing 50 with a construction of the driving apparatus 12 being restrained from being complicated. From another viewpoint, the rib portion 88 provided between the first and second boss portions 72, 74 is utilized to supply the oil OIL to the bearing 50, the bearing 50 can be lubricated with the construction being restrained from being complicated. A rib portion like the rib portion 88 cannot be provided in an arrangement in which the relief valve 54 is stored in the pump cover 52. However, the rib portion 88 can be provided in the driving apparatus 12 in which the casing cover 60 includes the second boss portion 74 in which the relief valve 54 is stored.

In the present embodiment, in a state in which the transaxle case 20 is installed in the vehicle 10, the above-described other of the opposite end portions of the rib portion 88, which is located on a side of the bearing 50, i.e., on a side of the first boss portion 72, is located on a lower side of the above-described one of the opposite end portions of the rib portion 88, which is located on a fluid supply side, i.e., on a side of the second boss portion 74, so that the oil OIL supplied to the above-described one of the opposite end portions of the rib portion 88 can be caused to flow along the rib portion that defines the lubricant passage 94.

In the present embodiment, the casing cover 60 includes the third boss portion 98 configured to receive the oil OIL that is to be supplied to the above-described one of the opposite end portions of the rib portion 88 on the side of the second boss portion 74, from the side of the second casing 58, so that the oil OIL can be supplied through the third boss portion 98 from the side of the second casing 58 to the above-described one of the opposite end portions of the rib portion 88 on the side of the second boss portion 74.

While the preferred embodiment of this invention has been described in detail by reference to the drawings, it is to be understood that the invention may be otherwise embodied.

For example, in the above-described embodiment, the pump cover 52 is fixed to the step portion 82 of the first boss portion 72 through the bolts 84. However, this arrangement is not essential. The pump cover 52 may be fixed to the step portion 82 of the first boss portion 72, for example, with an arrangement in which the pump cover 52 is loosely fitted in the space radially inside the second inner circumferential surface 78 and is pressed against the step portion 82 by the bearing 50 that is tightly fitted in the second inner circumferential surface 78, or alternatively, with an arrangement in which the pump cover 52 is press-fitted in the second inner circumferential surface 78. In these arrangements without use of the bolts 84 to fix the pump cover 52 to the first boss portion 72, too, the increase of the number of required components can be further restrained.

In the above-described embodiment, the second motor generator MG2 is disposed on the third axis C3 that is other than the axis of the pump drive shaft 46 in the vehicle driving apparatus 12. However, the vehicle driving apparatus 12 may be modified, for example, such that the second motor generator MG2 as well as the first motor generator MG1 is disposed to be coaxial with the pump drive shaft 46. In this modified vehicle driving apparatus, the MG2 rotor shaft 36 may be rotatably supported by the first boss portion 72 of the casing cover 60 though the bearing 50.

In the above-described embodiment, the vehicle driving apparatus 12 includes the engine 16 and the first and second motor generators MG1, MG2. However, this is not essential. The present invention is applicable to any vehicle driving apparatus that includes a fluid pump, a rotary member that is to be rotated about an axis of the fluid pump, a bearing rotatably supporting the rotary member, a pump cover covering the fluid pump, a relief valve, a casing including a casing body and a casing cover and storing therein, for example, the fluid pump.

In the above-described embodiment, the first casing 56 and the second casing 58 may be formed integrally with each other to constitute a single casing body. Further, the input shaft 22 and the pump drive shaft 46 may be constituted by a single rotary shaft. Still further, the relief valve 54 may include only a single valve unit and the second boss portion 74 may include only a single valve storing boss portion storing therein the single valve unit. Moreover, the oil pump 48 may be an external gear pump in which outer circumferential teeth of a drive gear and outer circumferential teeth of a driven gear mesh with each other.

In the above-described embodiment, the vehicle driving apparatus 12 is a driving apparatus that is to be used advantageously for a vehicle of FF (front engine and front drive) system. However, the present invention is applicable also to a drive-force transmitting device that is to be used for a vehicle of FR (front engine and rear drive) system or any other system.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: vehicle driving apparatus
20: transaxle case (casing)
44: MG1 rotor shaft (rotary member)
48: oil pump (fluid pump)
48o: outlet port
50: bearing
50a: inner circumferential surface
52: pump cover
54: relief valve
58: second casing (casing body)
60: casing cover
70: oil delivering passage (fluid passage)
72: first boss portion
74: second boss portion
78: second inner circumferential surface (supporting portion)
80: pump room
86a, 86b: valve rooms
88: rib portion
90: outer circumferential surface of second boss portion
92: outer circumferential surface of first boss portion
94: lubricant passage
96: through-hole
98: third boss portion
100: receiving hole

What is claimed is:

1. A vehicle driving apparatus comprising:
   a fluid pump;
   a rotary member that is to be rotated about an axis of the fluid pump;
   a bearing supporting the rotary member such that the rotary member is rotatable and is fitted at an axial end portion thereof in an inner circumferential surface of the bearing;
   a pump cover covering the fluid pump;
   a relief valve configured, when a pressure of a fluid ejected by the fluid pump exceeds a threshold pressure value, to discharge the fluid; and
   a casing storing therein the fluid pump, the rotary member, the bearing, the pump cover and the relief valve,
   wherein the casing includes (i) a casing body having an opening on a side of the bearing in a direction of the axis and (ii) a casing cover attached to the casing body and closing the opening of the casing body,
   wherein the casing cover defines therein a fluid passage that is in communication with an outlet port of the fluid pump, and includes cylindrical-shaped first and second boss portions,
   wherein the first boss portion cooperates with the pump cover to defines, in a space radially inside the first boss portion, a pump room in which the fluid pump is stored, and includes a supporting portion supporting the rotary member through the bearing which is located between the pump cover and the casing body and which is fitted in the space radially inside the first boss portion,
   wherein the first boss portion is located in a space outside the rotary member around a circumference of the rotary member, the first boss portion protruding in a direction parallel to the axis toward the casing body, and
   wherein the second boss portion defines therein a valve room that is in communication with the fluid passage, with the relief valve being stored in the valve room, the second boss portion protruding toward the casing body.

2. The vehicle driving apparatus according to claim 1, wherein the casing cover further includes a plate-shaped rib portion that protrudes toward the casing body,
   wherein the rib portion is connected at an end portion thereof to an outer circumferential surface of the second boss portion and at another end portion thereof to an outer circumferential surface of the first boss portion, and defines a lubricant passage for guiding the fluid supplied to the end portion of the rib portion, toward the other end portion of the rib portion, and wherein the first boss portion includes a connected portion that is connected to the lubricant passage, and has a through-hole provided in the connected portion such that the lubricant passage is in communication with a space radially inside the supporting portion through the through-hole.

3. The vehicle driving apparatus according to claim 2, wherein the rib portion defining the lubricant passage is provided in the casing cover, such that the other end portion of the rib portion is located on a lower side of the end portion of the rib portion in a vertical direction of a vehicle when the casing is installed in the vehicle.

4. The vehicle driving apparatus according to claim 2, wherein the casing cover further includes a cylindrical-shaped third boss portion protruding toward the casing body, and wherein the third boss portion is provided with a receiving hole that is in communication with the lubricant passage in the end portion of the rib portion such that the fluid received into the receiving hole from a side of the casing body is to be supplied through the receiving hole to the end portion of the rib portion.

* * * * *